United States Patent [19]
Conn

[11] 3,950,841
[45] Apr. 20, 1976

[54] METHOD OF LOCAL PLASTIC FLOW DIFFUSION BONDING OF METALLIC MEMBERS

[75] Inventor: Charles E. Conn, Santa Ana, Calif.

[73] Assignee: TRE Corporation, Beverly Hills, Calif.

[22] Filed: Feb. 11, 1974

[21] Appl. No.: 441,441

Related U.S. Application Data

[63] Continuation-in-part of Ser. No. 357,359, May 4, 1973, which is a continuation-in-part of Ser. No. 280,645, Aug. 14, 1972.

[52] U.S. Cl. ................................. 228/125; 29/509; 29/521; 228/136; 228/174; 228/193; 228/206
[51] Int. Cl.² .......................................... B23K 31/02
[58] Field of Search ............... 29/497.5, 498, 470.5, 29/475, 482, 483, 486, 521, 509; 403/267, 271, 282; 228/125, 136, 174, 182, 193–197, 206

[56] References Cited
UNITED STATES PATENTS

| | | | |
|---|---|---|---|
| 1,284,263 | 11/1918 | Duffy | 403/282 |
| 1,937,997 | 12/1933 | Townsend | 29/482 |
| 1,973,591 | 9/1934 | Weber | 29/483 |
| 2,376,574 | 5/1945 | Collins | 29/482 |
| 2,894,321 | 7/1959 | Dubilier | 29/497.5 |
| 3,158,732 | 11/1964 | Kazakov | 29/498 |
| 3,320,666 | 5/1967 | Dion | 29/497.5 |
| 3,444,608 | 5/1969 | Conn, Jr. et al. | 29/475 |
| 3,555,666 | 1/1971 | Rhee | 29/498 |
| 3,626,582 | 12/1971 | Melill | 29/497.5 |
| 3,632,410 | 1/1972 | Vargo | 29/498 |

FOREIGN PATENTS OR APPLICATIONS

| 25,639 | 3/1915 | Norway | 29/486 |
|---|---|---|---|

Primary Examiner—Carl E. Hall
Attorney, Agent, or Firm—Blakely, Sokoloff, Taylor & Zafman

[57] ABSTRACT

The present invention is a method for constructing a solid state diffusion bonded connection which is homogeneous, capable of efficiently transmitting stress and capable of being analyzed. The method provides for the achievement of homogeneous filleted junctures which are required by long-life structural fatigue specifications. The method also provides a mechanical interlock feature which produces a fail-safe connection. By the invented method, only the amount of material required to form the desired structural connection is used. The members to be joined are cut from sheets or plates of a wrought alloy such that a predetermined amount of metal is available to produce the diffusion bond and specified filleting. Minimum force is required to produce the connection since only localized plastic flow diffusion bonding is required in the vicinity of the juncture of the members. The formed connection is homogeneous and has the same properties across the connection as the parent material. The invented method comprises the steps of determining joint flow volumes, establishing ram action tooling and pressure requirements, establishing the restraining tool configuration; assembling the members and tooling in a die assembly; heating the assembly in a vacuum to just below transformation temperature, and applying pressure to the members to cause creep and plastic flow.

43 Claims, 20 Drawing Figures

METHOD OF LOCAL PLASTIC FLOW DIFFUSION BONDING OF METALLIC MEMBERS

This application is a continuation-in-part of my co-pending application entitled "AERODYNAMIC SHELL STRUCTURE WITH FITTINGS AND METHOD FOR FABRICATING SAME" filed May 4, 1973, and assigned Ser. No. 357,359, which is a continuation-in-part of my application entitled "INTERNALLY STIFFENED CONTOURED SHEET STRUCTURE AND METHOD FOR FABRICATING SAME", filed Aug. 14, 1972 and assigned Ser. No. 280,645.

BACKGROUND OF THE INVENTION

1. Field of the Invention

This invention is directed generally to the field of metalurgical joinder of materials and more specifically to the solid state diffusion bonding of metallic members to achieve homogeneous joints.

2. Prior Art

Diffusion bonding is an ancient metal working technique in which metal members may be joined together. Solid state diffusion bonding is basically a two-stage process. The first stage is largely mechanical in nature and involves establishment of intimate surface contact through local plastic deformation to overcome asperities at the interface point. This results in the achievement of perfect metal to metal contact in the to-be-joined area. The second stage creates the homogeneous bond by diffusion; i.e., by the movement of molecular particles of metal across the interface. During these two stages, time, temperature, cleanliness and pressure are relevant to the adequacy of the bond produced. This technique for joining metal has been disregarded by structural design engineers for many years because of their inability to design readily buildable structural components. As a result, no significant saving of material could be achieved which would offset the increased costs incurred in utilizing the diffusion bonding process. Today, however, solid state diffusion bonding is in great demand for utilization in the aerospace industry among others, because it enables the achievement of homogeneous joints of parent material properties with no residual joining stresses. More precise knowledge of fabrication techniques enables sufficient savings in material to be made to warrant the higher costs of fabrication. Thus, where the strength to weight ratio is a paramount consideration, the diffusion bonding process provides the ability to fabricate near optimum shaped structural components from efficient material thereby achieving a reduction of structural weight while maintaining the required structural integrity. Diffusion bonding is almost without limit in its versatility and more than any other known method, affords the designer a great freedom to design new and different structural configurations and maximize the strength to weight efficiency.

In general, in addition to cost, three major factors must be taken into account when designing any type of structure. First is structural integrity, second is minimum weight and third is the ability to fabricate a real structure, duplicating the theoretical structural model and boundary conditions. These factors force the structural engineer to improve the accuracy of his analysis while developing arrangements of structural elements made of high strength materials joined in a manner to achieve higher structural efficiency. In these design analyses, any deviation from the theoretical homogeneous geometry causes locked in stresses, joint discontinuities and variable strain rates, resulting in lower structural efficiency. In addition, such deviations often result in weight penalties through the appearance of stress risers at irregular joints or connections. The diffusion bonded method of forming connections allows fabrication duplication of a theoretical design configuration which depends on a homogeneous material at the juncture points. The process also eliminates locked-in stresses and joint discontinuities.

The aerospace industry is the largest user of the solid state diffusion bonding process because of its ability to use complex analytical techniques to achieve highly efficient structural concepts. The designed structure can first be refined to an ultimate strength to weight efficiency and then mass produced. Airborne equipment requires that structural concepts yielding maximum strength and stiffness to weight ratios be utilized to achieve the required power to weight efficiency. In all cases it is desirable to minimize the weight of the structure. The aerodynamic gas pressure and flow characteristics typically impose bending strength/stiffness, torsional strength/stiffness, and shear strength/stiffness requirements upon the structural configuration that must be considered in the design. Diffusion bonding allows design of a joining technique which permits maximum strength to weight ratio structures.

In diffusion bonded joints an important aspect is the placement of the transition material for the efficient load transfer from the smaller load carrying member to the more massive member. Ideally, the smaller load carrying member and the larger member should be completely homogeneous members through out. One approach to this ideal structure is to carve the most efficient structural configuration from a mass of homogeneous material having a high strength to weight ratio, thereby, precluding any need for joining. However, except for the most simple structural components, the one piece homogeneous structure is neither optimally weight efficient nor economically feasible. The known techniques for producing homogeneous structural components include machining from bar or plate stock, net forging, forging plus machining and extruding (for constant section members). However, these production techniques are often not feasible when irregularly shaped, massive solid members at random locations are required, and they are especially infeasible when small internally stiffened shell members are required.

Because of the limitations on producing one piece homogeneous structures, techniques for joining one member to another are typically used in the prior art. All prior art production methods of joining metals, such as, for example, riveting, bolting, welding, brazing, organic bonding and polyimide bonding result in a load transfer capability lower than that of the parent material utilized; i.e., they do not achieve the required homogeneous properties and strain rate of the parent material across the joint. Welding, brazing and organic bonding are not only incapable of achieving the required homogeneous properties of the parent material across the joint but can not be used on complex shapes. Casting with alloys is not competitive for light-weight structurally efficient parts when compared to the wrought alloys. Extrusion can be used for any linear shape but cannot be performed when complex variable shapes are involved. The only real alternative is machining, which cuts the net shape from a solid piece of metal. This method, however, is costly, and if thin members of complex shape are desired, machining becomes very inefficient. It is also expensive because of the amount of alloy which must be machined from the original piece of metal.

The solid state diffusion bonding technique, on the other hand provides, (i) a means for achieving full parent material strength across the joint interface because no foreign material is utilized, and (ii) strain compatibility across the joint interface. Several diffusion bonding techniques have been developed, such as, for example, roll bonding, press bonding and vacuum bag bonding. However, each of these techniques imposes limitations on the structural configuration achievable. For example, roll, press and vacuum bag diffusion bonding techniques cannot produce the desired blending or filleting. In addition, they are not applicable to complex aerodynamic shapes. Each of these known techniques of diffusion bonding and their respective limitations and shortcomings are briefly described hereinbelow.

The roll diffusion bonding technique utilizes a steel tooling retort with positioning filler tooling to locate the members to be joined in proper respective positions. The intimate contact is established by roll reducing both the retort tooling and the to-be-joined parts by a percentage (generally 50% to 60%) to guarantee completely intimate surface contact and diffusion bonding. Thus, this process requires expendable tooling and is basically limited to the attachment of members in the rolling direction. The degree of joined member filleting is limited by the combination of tooling material flow and detail parts flow.

The press diffusion bonding technique utilizes reusable positioning and restraining tooling and massive hydraulic presses as the pressure source to establish the intimate contact. However, in order to utilize reusable tooling, the local surface deformation is generally limited to less than 5%. This requires the surfaces to be joined to be matched within very close tolerances. In addition, it also requires, because of the relatively low local unit pressure, a long time at the elevated temperature to allow the diffusion cycle to complete. Flow filleting is very limited because of the low local deformations allowable.

The vacuum bag bonding technique utilizes atmospheric pressure as the pressure source and is thus limited to very thin sheet structures which can attain the required intimate surface contact at this relatively low pressure. Because of this low pressure, a very long time at the elevated temperature is required to complete the diffusion cycle. In addition, flow filleting cannot be achieved.

The present invention overcomes these above-described limitations of the prior art and discloses a method of producing a diffusion bonded joint between a first member and a second, more massive member using minimum energy principles, i.e., minimum energy or force is required, sufficient only to flow the material at each juncture on the members. The invented method for diffusion bonding utilizes reusable tooling and achieves filleting and attachment in multiple directions. It also enables one to shape the member intersections so as to minimize stress concentrations. Moreover, all of the advantages of the present invention are attainable within the constraints of the economic feasibility.

BRIEF SUMMARY OF THE INVENTION

The present invention is a method for constructing a solid state diffusion bonded connection between simple elements to form a a more complex, efficient structure. The connection, when completed, has the same physical properties as if formed from a solid single piece of material. This method provides for achievement of homogeneous filleted junctures which are required by long-life structural fatigue specifications. The method also provides a mechanical interlock feature which produces a fail-safe connection.

The method employs several steps to form the solid state diffusion bonded joint. First, the joint flow volumes which are necessary to form the joint and the fillets are determined. Then a die assembly is designed which will provide the necessary local pressure and filleting configuration. The die assembly comprises ram tooling and restraining tooling, the configuration of which must be established. The members which are to be joined are then fabricated each having its predetermined flow volume of additional material. The surfaces of the to-be-joined members and the die members are then cleaned so that complete diffusion bonding may occur. After being cleaned, the members are assembled and positioned in the die assembly in their desired positions. The die assembly is then placed in either a vaccum furnace or a retort envelope in order to exhaust gases which may cause oxidation or contamination and thereby impede the diffusion process. The die assembly and members are next heated to a temperature just below the member transformation temperature of the metal from which members are made. Pressure is then applied at a controlled rate and held until plastic flow and creep take place, forming a diffusion bond, having the desired shape, at the interface of the members. After creep and flow diffusion bonding are completed, the parts are cooled and removed from the vacuum and the die assembly. Any excess material i.e., flashing, is machined off.

It is therefore an object of this invention to provide a cost effective method for the fabrication of many different lightweight structurally efficient homogeneous components fabricated from wrought alloy members. In many structural applications having complex configurations, the present invention is the only technique known to achieve the required homogeneous connections between the members.

It is another object of this invention to form a diffusion bonded connection utilizing minimum energy principles. Minimum force is required to produce the connection since localized plastic flow diffusion bonding is required only at each juncture of the members.

The novel features which are characteristic of the present invention, as well as other objects and advantages thereof, will be better understood from the following detailed description, reference being had to the accompanying drawings in which the presently preferred embodiment and method of the invention are illustrated by example.

DETAILED DESCRIPTION

Figure 19:
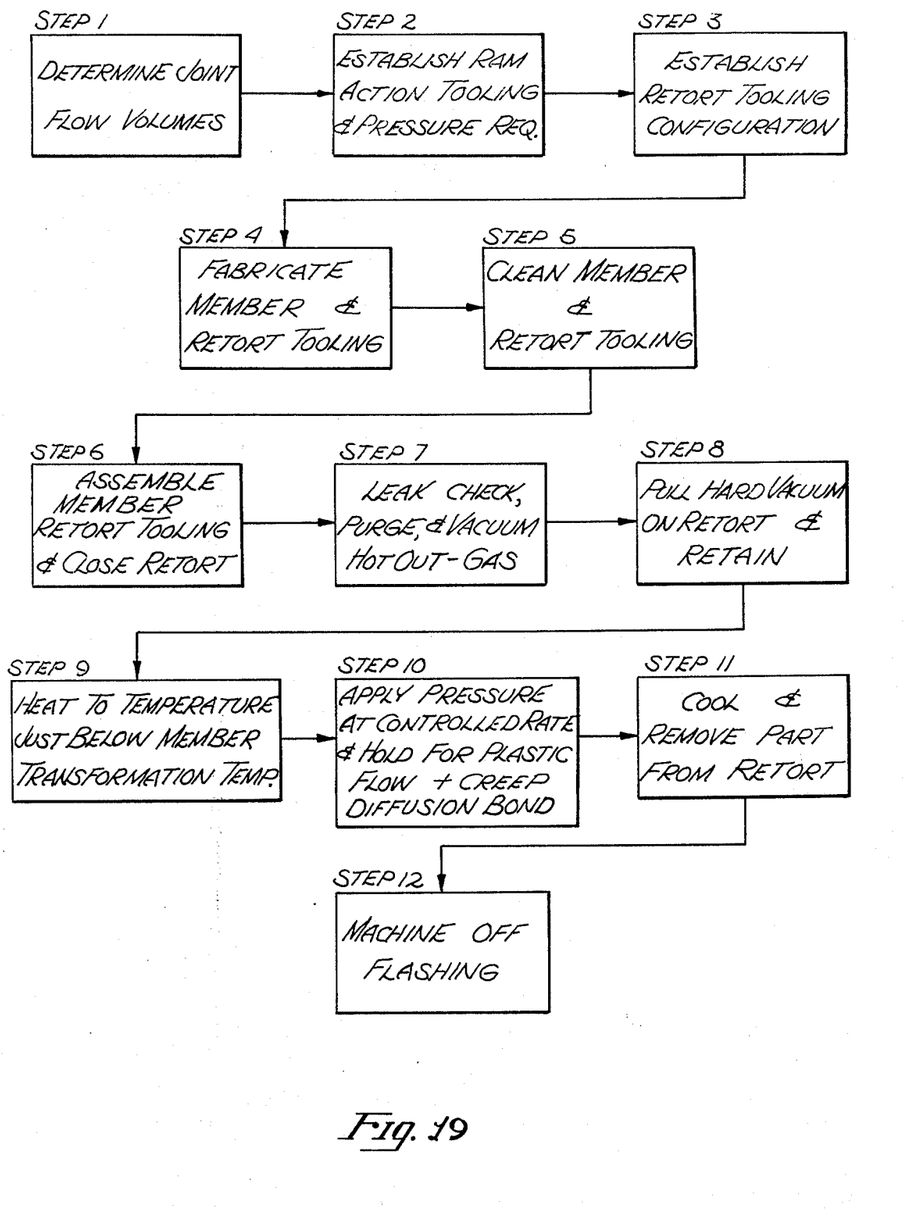
FIG. 19 represents a functional block diagram showing the basic steps of the retort tooling method as applied to fabricating a diffusion bond juncture.

The present invention is now described in detail with respect to the fabrication of certain typical components. In all Figures, like numerals are used to designate like elements. For a better understanding of the following description, reference should be made to FIGS. 19 and 20 which functionally depict the flow of the steps of two preferred methods of the present invention. The first employs a retort die assembly while the second employs a die in a vacuum furnace press.

Figures 1, 2, 3, 4, 5, 6:
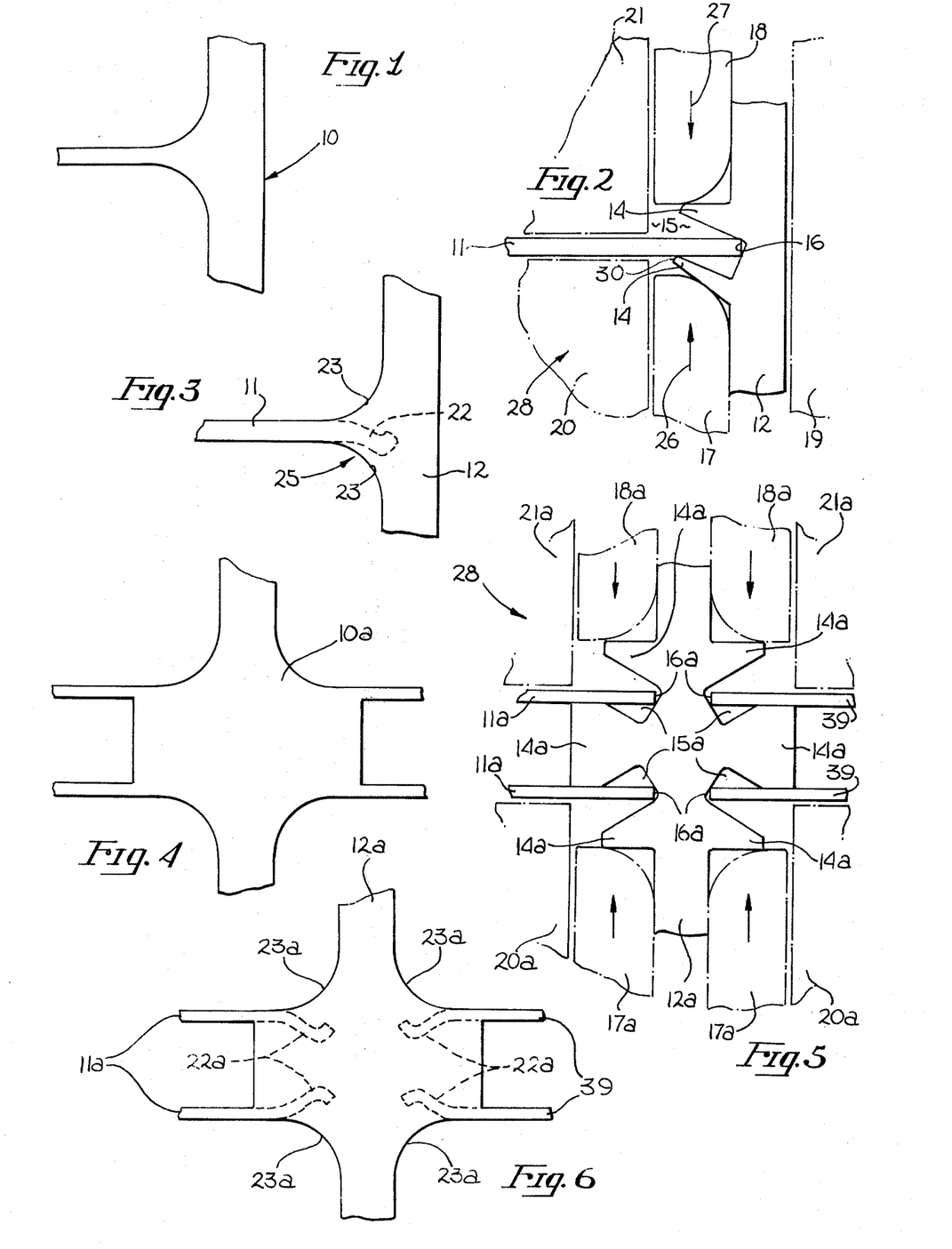
FIG. 1 is a partial sectional view of a desired, single "T", homogeneous filleted juncture between a first member and a second member.
FIG. 2 is a partial sectional view of a single "T" juncture between a first member and a second member positioned in a die assembly prior to plastic flow.
FIG. 3 is a partial sectional view of a single "T" juncture between a first member and a second member showing plastic flow of the filleted material and the mechanical interlock.
FIg. 4 is a partial sectional view of the desired, double "T", homogeneous filleted juncture between two thin layered shell members and a second member.
FIG. 5 is a partial sectional view of double "T" juncture between two thin layered shell members and the second member positioned in a die assembly prior to plastic flow.
FIG. 6 is a partial sectional view of a double "T" juncture between two thin layered shell members and the second members showing plastic flow of the filleted material and the mechanical interlocks.

FIG. 2 shows the basic elements required to form a solid state diffusion bond filleted connection, namely a first member 11, a second member 12, and a die assembly 28 comprised of ramming tools 17 and 18 and restraining tool 19, 20 and 21. The first member 11, in the presently preferred embodiment, is normally the load transferring member. The first member 11 has one end 16 which forms part of the diffusion bonded juncture. The second member 12 has a rectangular trough 15 which also forms a portion of the diffusion bonded juncture. The trough 15 is defined by the two flow volumes 14 which are a homogeneous part of the second member 12. The longitudinal axis of the trough 15 is disposed at an acute angle of approximately 15° to 30° to the longitudinal axis of the first member 11 to provide the positive interlock feature. When end 16 of the first member 11 is disposed within the trough 15, it contacts a corner of the trough 15 as illustrated in FIG. 2.

The die assembly 28, used to accomplish the plastic deformation, is comprised of restraining tools 19, 20 and 21 and ramming tools 17 and 18. The restraining tools 20 and 21 insure that the first member 11 remains in alignment during plastic flow and diffusion bonding. The restraining tool 19 insures that the second member 12 remains in its corresonding alignment. The restraining tools are disposed such that the ramming tools 17 and 18 can cause the plastic deformation of flow volumes 14 and thereby form the filleted connection. The ramming tool 17 may be driven by a pneumatic or hydraulic or mechanical press in direction 26 opposite to direction 27 of ramming tool 18. Because of the angle between the axis of the trough 15 and the axis of the first member 11, the end 16 of the first member 11 is physically bent into the trough 15 when the pressure is applied, thereby forming the mechanical interlock 22, after flow filling the trough 15. This is seen in FIG. 3. The ends of the ramming tools 17 and 18 have curved portions which form the fillets and flow fill the trough 15 during the plastic deformation. FIG. 3 shows the diffusion bonded part 25 in cross section, after the plastic deformation and diffusion bonding has occurred. For comparison, FIG. 1 shows in cross section, a corresponding part 10 made from a single piece of material. Part 25, made by the method of this invention, substantially achieves the desired structural characteristics which are obtainable from single member part 10.

The method for fabricating diffusion bonded connections basically requires the selective positioning of slightly excess material to provide positive fill in the junction area, such that plastic flow of this requires volume of material forms a homogeneous joint with the required fillets. The excess material is flowed to the periphery of the juncture, the longitudinal ends of this example, and later trimmed off like flashing. By means of tooling design, high localized pressure is applied only in the joint area, thereby requiring minimum energy. The method of fabricating diffusion bonding joints will now be described in detail with reference to FIGS. 1, 2 and 3 and the preferred embodiment of the method described in FIG. 19.

Step 1 is the determination of the shape and size of joint flow volumes, defined as that volume of material required to supplement the intersection of straight line element parts and form the fillets, and their direction of flow. Every structural connection 25 requires certain fillets 23, i.e., blending geometry at each juncture. Joint flow volumes are determined from this geometry. The material forming the flow volumes, increased by approximately 5% to 10% to provide positive fill without unnecessarily close tolerances, is designed as a homogeneous part of the members in the juncture area. However, it should be understood that the flow volumes can be located on either member or divided between the two members. In any event, the location of flow material is constrained by the objective of maintaining member simplicity. The placement of the flow volume material in a simplified manner on the members (i) enable the machining of the members to be done with simple machine cuts, and (ii) reduces the requirement for zero tolerance fit-up of members and the fit-up of the members in the die assembly, such perfect fit-ups usually being required to achieve the diffusion bond. The material of the flow volumes is ultimately plastic flowed by the die action to achieve the intimate contact required for diffusion bonding. The details of placement of the flow material on the member or members is a function of the members and the connection to be achieved. The flow volumes 14 in the embodiment of FIG. 2 are disposed on the second member 12. FIG. 2 also illustrates the positioning of the first member 11 and its end 16 relative to the second member 12. As described above, the shape of slot 15 of the second member 12 and positioning of the flow material 14 causes the end of the first member 11 to provide a mechanical interlock 22 after the materials are plastic flowed and diffusion bonded. This mechanical interlock 22 provides a safety feature for the solid state diffusion bonded joint and is best shown in FIG. 3.

Step 2 is to establish the ram action tooling and pressure requirements of the die assembly 28 by methods known in the art. Having established the amount and position of the flow volumes 14 and the direction of their flow, the ramming tool action directions 26 and 27 are determined. Since economic feasibility is one of the main objectives of this invention, the ramming tools 17 and 18 are designed such that only a single direction or at most a two-directional force is required. Internal force components caused by plastic flow in the joint areas are balanced by restraining tool 19, 20 and 21. The ram action force is determined from the quantity and position of flow volumes 13 and the resulting geometry of the members. The duration of application of this ramming force can be determined from the plastic flow and creep characteristics of the members and the temperature at which the diffusion bonding is performed by methods known in the art. In addition to the ramming force required to achieve plastic deformation of the flow volumes, whatever additional small force is required to form the members to a desired contour is also determined.

It is well known that, at elevated temperatures, metallic materials will plastic and creep flow when pressure is applied to them for a finite period of time. It is the plastic flow characteristic of metallic materials which makes possible the intimate surface contact and precise shaping which, in turn, enables an effective diffusion bond to be formed. It is preferable to use the highest elevated temperature during diffusion bonding and plastic deformation, but not to exceed the transformation temperature of the alloy. In the case of 6 Al-4V Titanium, of example, the transformation temperature is approximately 1820° F, and, thus, the preferred bonding temperature. However, the transformation temperature will vary from heat batch to heat batch of production alloy; thus, a safe operating temperature for diffusion bonding is approximately 50° F to 100° F below the published transformation temperature for the alloy. For any alloy, the plastic flow characteristics can be determined as a function of temperature, force and rate of force application.

Step 3 is the establishment of a retort tooling configuration. The achievement of a solid state diffusion bond connection requires that the surfaces to-be-joined are clean and free of surface oxides and other foreign contaminates, organic and otherwise. The requisite state of cleanliness must be maintained throughout the joining process. The preferred method for preventing oxidation during the heat processing of the diffusion bond is to use a hard vacuum such as, for example, $10^{-4}$ torr minimum. The requisite vacuum is obtainable by use of a die assembly 28 which is designed to form a retort or is enclosed in a metallic membrane retort envelope, as is well known in the art. FIG. 2 illustrates a portion of a typical die assembly 28 which can be inserted within a retort.

Step 4 is the fabrication of the members and the retort tooling elements. The flow volumes 14 have been calculated and are a homogeneous part of the second member 12. Typically, they are machined with second member 12 from a solid piece of material. Although the flow volumes 14 have a particular configuration in FIG. 2, many different configurations of flow volumes are possible to permit the particular application. A few examples of other typical applications are discussed more fully hereinbelow. The die tooling details, illustrated in FIG. 2, are typically fabricated from an alloy steel which will not interdiffuse with the members being joined. Thus, for example, if the members being joined are titanium alloy, Armco 22—4–9 stainless steel alloy (22% chromium, 4–4% nickel, and 9% manganese) could be used since it satisfies the requirement of non-interdiffusion.

Step 5 involves cleaning the members 11 and 12 and die assembly 28 prior to loading the die assembly. As stated above, the achievement of a solid state diffusion bond connection requires that the surfaces to-be-joined are clean, free from surface oxides and other foreign contaminates, organic and otherwise. The requisite state of cleanliness must be maintained throughout the joining process. If the first member 11 and the second member 12 are titanium alloy, they may be cleaned by acid pickling techniques known in the trade. This process removes the surface oxides. A suitable acid for titanium is nitric hydroflouric ($HNO_3$). With reference to the die assembly, if it is made of alloy steel, it is typically solvent cleaned to remove all organic contaminants. A typical solvent suitable for this purpose is acetone.

Step 6 involves the assembly of the members into the die assembly and the making of the retort seal. The members to-be-joined are maintained clean and assembled in a dust-free atmosphere. White glove handling is preferred. The parts must be positioned in their correct relationship as illustrated in FIG. 2. Prior to be positioned, the first member 11 is tack welded to the second member 12 at contact point 30 in order to maintain proper alignment during diffusion bonding. This tacking is accomplished at non-final peripheral points such as the areas used for the surplus material flow of flashing. Next, the components of the die assembly 28 are positioned such that the restraining tools 19, 20 and 21 and ramming tools 17 and 18 will form the properly shaped connection. The retort seal (not shown) is then made by welding a membrane around the edges of die assembly 28.

Step 7 involves leak checking, and hot out-gassing. The retort assembly (not shown) containing the die assembly 28, is leak checked at a pressure of $10^{-4}$ torr vacuum. To further clean the retort assembly, it is purged at least three times with an inert gas such as argon, i.e., it is evacuated, argon filled, evacuated, argon filled, and evacuated again. The retort assembly is then vacuum hot out-gassed to remove any remaining contaminants. Typically, it is heated to approximately 1000° F for at least 30 minutes.

Step 8 requires pulling and maintaining a hard vacuum on the retort assembly through steps 9, 10, and 11. The preferred hard vacuum is at least $10^{-4}$ torr.

Step 9 requires heating the members to a temperature just below the transformation temperature. To maintain the original wrought alloy properties of the to-be-joined materials, the process temperature must not exceed the transformation of the particular alloy. On the other hand, however, the maximum permissible temperature is desired to achieve the greatest plastic flow. As indicated above, a compromise is a temperature about 50°–100° F below this transformation temperature. The retort assembly containing the first and second members 11 and 12 and die assembly 28, are allowed to soak at this temperature for at least an hour to provide uniform temperature distribution.

Step 10 involves the application of pressure to the die assembly 28 in order to achieve plastic flow and creep. By virtue of such pressure, the ramming force is applied to the flow volumes 14 and the first and second members 11 and 12 as described in Step 2. Pressure can be applied in a variety of different manners and is functionally dependent upon the equipment being used. One method is to remove the retort assembly from the furnace and place it in an insulation box which will maintain the required temperature. The insulation box may be closed and placed in an hydraulic press as the load is applied as shown and described in my co-pending application Ser. No. 357,359. After the required deformation is achieved, the load is maintained to take advantage of creep deformation as well as to complete the plastic flow to fill any remaining pockets in trough 15. Note that, if the alloy is titanium, the pressure can be maintained until the temperature drops to approximately 1400° F.

Step 11 involves cooling and removal of the member from the retort assembly. The retort assembly is cooled and opened such that the die assembly and diffusion bonded part 25 may be removed.

Step 12 requires machining off any flashing; that is, after the diffusion bonded juncture has been formed, slight flashings, protrusions or rough edges created from plastic flow can be removed by machining techniques well known in the art. The completed part 25, made by the presently preferred method, is shown in FIG. 3 after being machined. The dotted lines show the machanical interlock 22, the fillets 23 of the part 25 are also shown.

Figure 20:
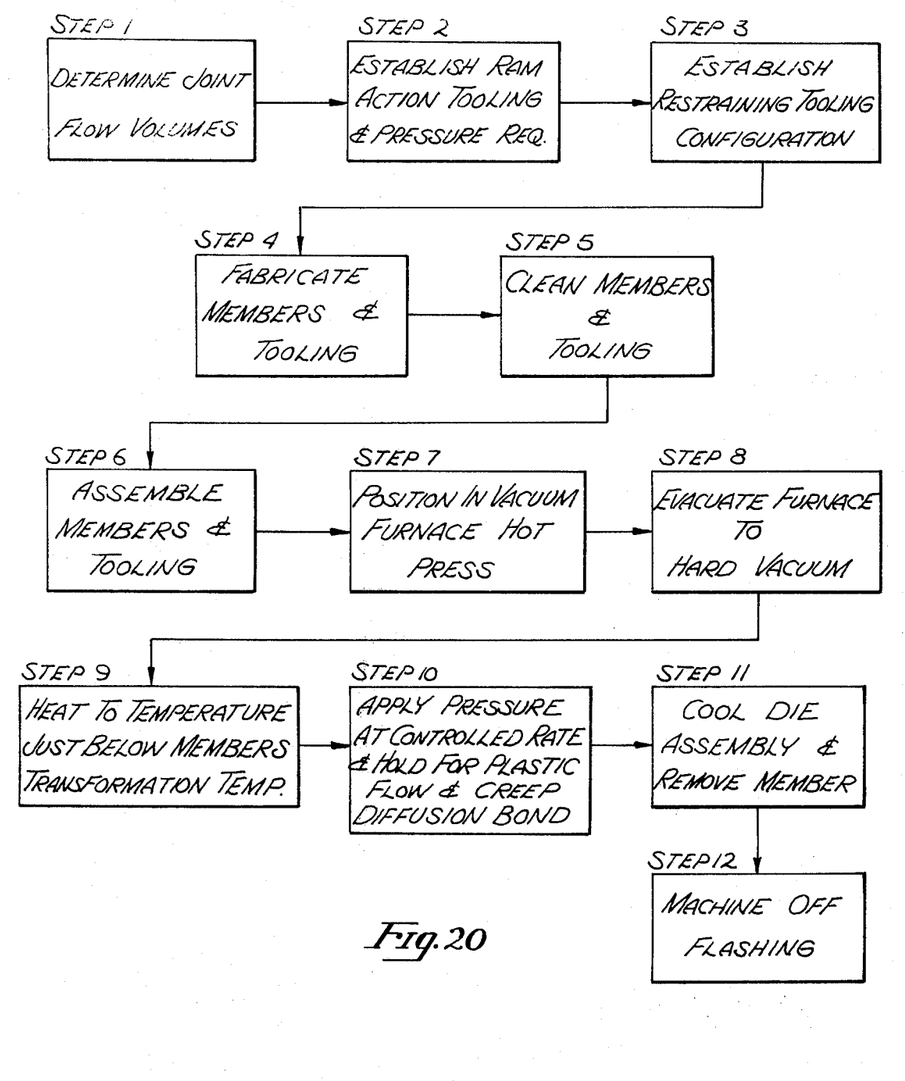
FIG. 20 represents a functional block diagram showing the basic steps of the restraining tooling vacuum furnace-hot press method as applied to fabricating a diffusion bonded juncture.

A second preferred method for completing the solid state diffusion bond of the present invention is described with reference to FIG. 20. The distinction between the first and second method is that the second method utilizes a vacuum furnace-hot press rather than a retort assembly. The steps involved in the second preferred method are the same as in the first preferred method with the only exceptions being noted as follows: in step 3 the restraining tooling configuration is determined without the design requirement of forming a vacuum retort. Basically, the difference is simpler and lower cost tooling; however, if a membrane envelope retort were used, the tooling could be identical in both cases. Both methods are well known in the art and, hence, are not discussed here. Step 6 of the second preferred method differs from Step 6 of the first only in that the members are not assembled in a retort assembly. However, the members and die assembly are assembled in proper alignment. Steps 7 and 8 of the second preferred method differ from Steps 7 and 8 of the first preferred method in that the members are positioned in a vacuum furnace-not press rather than in a retort assembly. Step 11 in the second preferred method requires furnace cooling while maintaining the vacuum prior to removal of the completed part 25 and die assembly from the furnace press.

In summary, accomplishment of a complete homogeneous diffusion bond connection between metallic members requires cleanliness, intimate contact, and exposure to an elevated temperature for a period long enough to allow the inter-surface diffusion to be completed. In general, the intimate contact is established by pressure; further, the higher the pressure and temperature utilized the shorter the diffusion time required. The invented method utilizes all of the ingredients of solid state diffusion bonding, including cleanliness, intimate contact and pressure, temperature and time.

The methods for making a solid state diffusion bond has been described in relation to the part shown in FIGS. 1, 2 and 3. However, that is only one example of the kinds of members which can be joined by the present invention. Several additional examples of diffusion bonded connections are shown in the drawings and are described below. All of the examples may be performed using either of the preferred methods described above. The procedural steps for forming the filleted diffusion bonded joint has been previously discussed and will not be described again with reference to the following additional applications. In addition, in each of the following applications, the ramming and restraining tool configurations are designed to form the required fillets. It should be understood that the application described below do not limit, nor do they illustrate all of, the potential ways of forming diffusion bonded connections between two or more members.

Now referring to FIGS. 4–6, a second example, a double "T" homogeneous filleted juncture between two first members, i.e., two thin layered shell members, and a second member is illustrated. FIG. 4 illustrates the desired appearance of the finalized connection. FIG. 5 illustrates how two first members 11a and 39, a second member 12a, ramming tools 17a and 18a and restraining tools 20a and 21a are disposed prior to diffusion bonding.

The second member 12a has six interdependent flow volumes 14a which are designed such that a complete diffusion bonded filleted joint can be achieved. Four troughs 15a are formed, into which the ends 16a of the first members 11a and 39 are disposed such that the intersection at the axis of ends 16a and the axis of each trough 15a form an acute angle of approximately 15° to 30°. In this example, two sets of restraining members 20a and 21a, and two sets of ramming tools 17a and 18a are used to form the die assembly 28. The four troughs 15a are arranged such that, when the ramming tools 17a and 18a begin applying the pressure at the juncture area, the ends 16a of the first members 11a and 39 are physically bent into the troughts 15a to form the mechanical interlocks 22 after flow filling the troughs, as best seen in FIG. 6. FIG. 6 shows the structural connection in cross section after plastic flow deformation and diffusion bonding has occured. For comparison, FIG. 4 shows, in cross section, a corresponding part 10a made from a single piece of material (which actually would not be buildable with thin layered shell structures) and exhibiting the characteristics desired and substantially achieved by the present invention; i.e., by plastic deformation and diffusion bonding. Thus, by the invented method, a very complex connection can be made between two thin layered shell members and a second member such that a solid state diffusion bonded joint is formed with mechanical interlocks 22a.

Figures 7, 8, 9, 10, 11, 12:
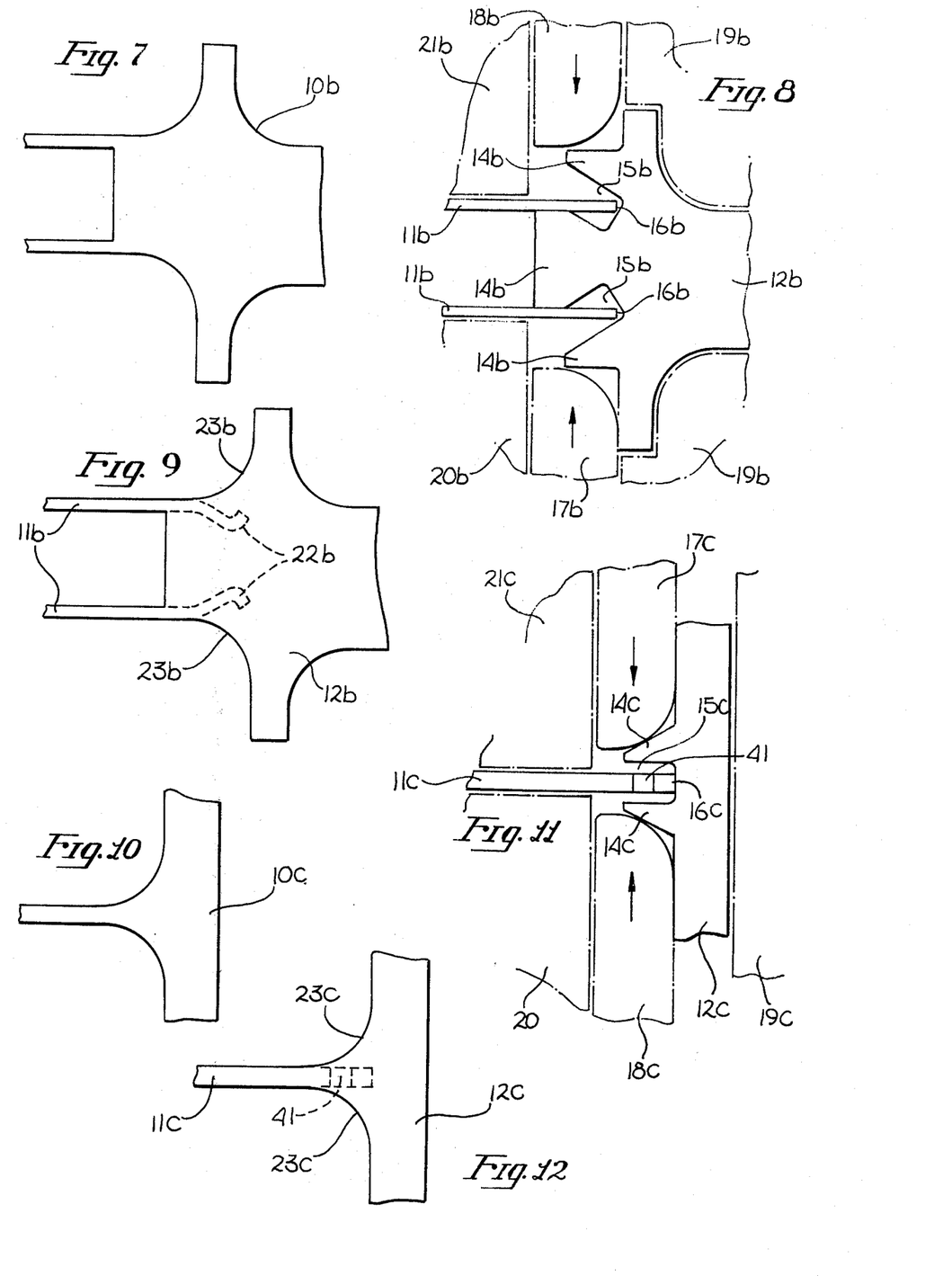
FIG. 7 is a partial sectional view of the desired, single "T", homogeneous filleted juncture between a first member (a thin layered shell member) and a second member.
FIG. 8 is a partial sectional view of a single "T" juncture between a first member (a thin layered shell member) and a second member positioned in a die assembly prior to plastic flow.
FIG. 9 is a partial sectional view of a single "T" juncture between a first member (a thin layered shell member) and a second member showing plastic flow of the filleted material and the mechanical interlocks.
FIG. 10 is a partial sectional view of the desired, single "T", homogeneous filleted juncture between a first member having an aperture at one end (actually, a series of apertures along the length of the member) and a second member.
FIG. 11 is a partial sectional view of a single "T" juncture between a first member having an aperture at one end and a second member positioned in a die assembly prior to a plastic flow.
FIG. 12 is a partial sectional view of a single "T" juncture between a first member having an aperture at one end and a second member showing plastic flow of the filleted material and the mechanical interlock by filling of the aperture.

Now referring to FIGS. 7–9, a third example, a single "T" homogeneous filleted juncture between a first member, a single thin layered shell member, and a second member is illustrated. FIG. 7 represents a cross section of a corresponding part 10a made from a single piece of material, exhibiting the characteristics desired after plastic flow deformation and diffusion bonding. FIG. 8 illustrates the position of the first member 11b, the second member 12b, the ramming tools 17b and 18b, and restraining tools 19b, 20b and 21b prior to plastic deformation. The second member 12b has three independent flow volumes 14b which form two troughs 15b. The flow volumes 14b are designed and calculated such that after plastic deformation, a complete homogeneous filleted connection is obtained. The ends 16b of the thin layered shell member 11b are disposed in the troughs 15b such that the axis of ends 16b and the axis of trough 15b intersect in an acute angle of approximately 15° to 30°. The troughs 15b are arranged such that, as the ramming tools 17b and 18b begin applying the pressure at the juncture area, the ends 16b of the first member 11b are physically bent into the trough 15b to form the mechanical interlock 22b after flow filling of the troughs, as best seen in FIG. 9. FIG. 9 illustrates the structural connection in cross section, after the plastic flow deformation and diffusion bonding has occurred.

Referring now to FIGS. 10–12, a fourth example, a single "T" homogeneous filleted juncture between a first member and a second member is shown. FIG. 10 represents a cross section of corresponding part 10c made from a single piece of material, exhibiting the characteristics desired after plastic flow deformation and diffusion bonding. FIG. 11 illustrates the positioning of the first member 11c and the second member 12c in relation to the ramming tools 17c and 18c and the restraining tools 19c, 20c and 21c. The second members 12c has two flow volumes 14c which forms a trough 15c and are disposed perpendicular to the longitudinal axis of the second member 12c. The end 16c of the first member 11c is disposed within trough 15c. The unique characteristic of the example is that the first member 11c has a series of apertures 41 along the longitudinal edge which are disposed through the first member 11c close to end 16c to be located within trough 15c. After plastic flow deformation and diffusion bonding has occurred, material from the flow volumes 14c will fill the apertures 41 thereby forming the mechanical interlock as illustrated in FIG. 12. FIG. 12 shows the structural connection in cross section after the plastic flow deformation and diffusion bonding has occurred.

Figures 16, 17, 18:
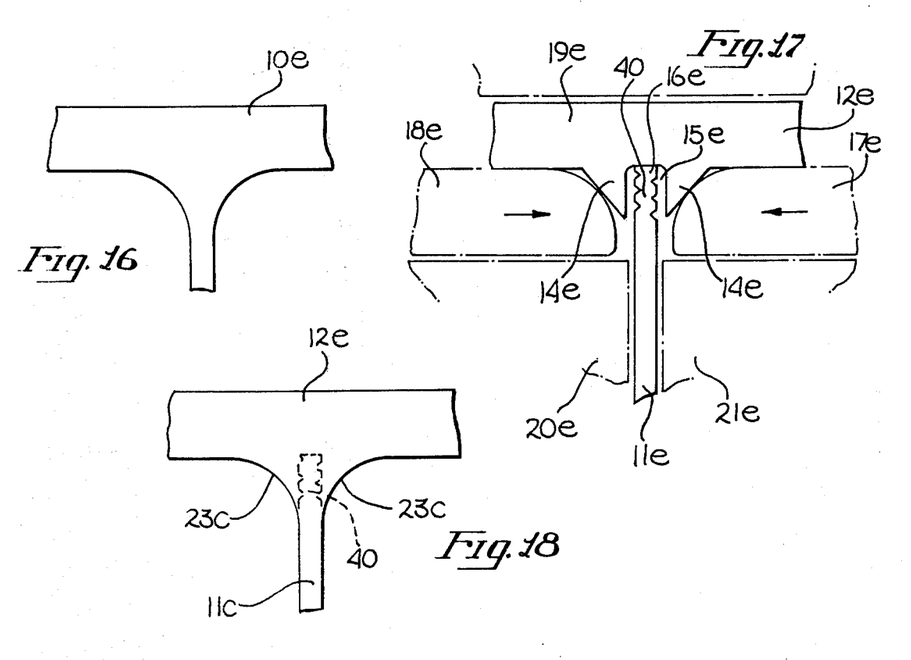
FIG. 16 is a partial sectional view of the desired, single "T", homogeneous filleted juncture between a first member having a serrated end and a second member.
FIG. 17 is a partial sectional view of a single "T" juncture between a first member having a serrated end and a second member positioned in a die assembly prior to plastic flow.
FIG. 18 is a partial sectional view of a single "T" juncture between a first member having a serrated end a second member showing plastic flow of the filleted material and the mechanical interlock.

Now referring to FIGS. 16–18, a fifth example, a single "T", homogeneous filleted juncture between a first member and a second member is illustrated. FIG. 16 represents a cross section of a corresponding part made from a single piece of material, exhibiting the characteristics desired after plastic flow deformation and diffusion bonding. The configuration of the second member 12e is similar to that of the second member 12c in the fourth example. It has a trough 15e and two flow volumes 14e. The trough 15 is disposed vertically in relation to the longitudinal axis of the second member 12e. The end 16e of the first member is disposed within the trough 15e prior to and during plastic flow deformation and diffusion bonding. The unique feature of this example is that the end 16e of the second member is serrated with V-shaped grooves 40. The die is comprised of the ramming rools 17e and 18e and restraining tools 19e, 20e and 21e. During plastic flow deformation and diffusion bonding, the flow volumes 14e form the fillets 23 and mechanical interlock will be filling the V-shaped grooves 40 with their material, as shown in FIG. 18. FIG. 18 shows the structural connection in cross section, after the plastic flow deformation and diffusion bonding has occurred.

Figure 13:
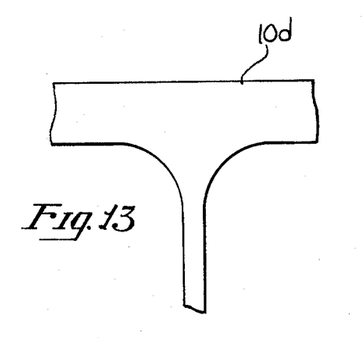
FIG. 13 is a partial sectional view of the desired, single "T", homogeneous filleted juncture between a first member and a second member.
Figure 14:
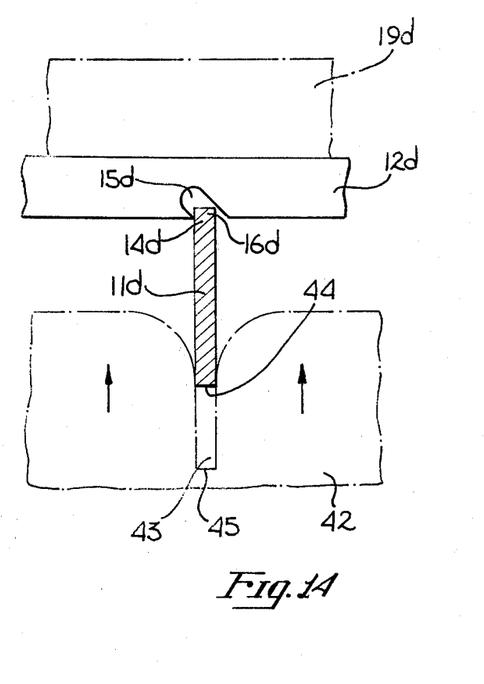
FIG. 14 is a partial sectional view of a second single "T" juncture between a first member and a second member positioned in a die assembly prior to plastic flow.
Figure 15:
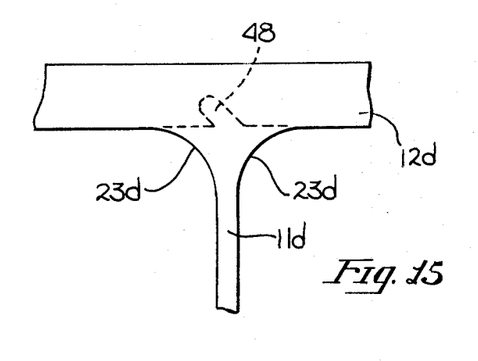
FIG. 15 is a partial sectional view of a second single "T" juncture between a first member and a second member member showing plastic flow of the filleted material and the mechanical interlock.

Now referring to FIGS. 13–15, the sixth example, a single "T" homogeneous filleted juncture between a first member and a second member is illustrated. FIG. 13 represents a cross section of corresponding parts made by a single piece of material, exhibiting the characteristics desired after plastic flow deformation and diffusion bonding. In this example, the second member 12d has a trough 15d disposed at an acute angle of approximately 15° to 30° to one of its longitudinal sides. No flow volumes are disposed on the second member 12d. The first member 11d is a thinner section and is designed to be excessively long so that material at its end 16d serves as the required flow volume 14d. The ramming tool 42 is unique in this example because of a special slot 43 therein which serves to position the first member 11d while applying pressure to cause the plastic flow deformation and diffusion bonding of the members. A restraining tool 19d is disposed such that as the ramming tool 42 is driven toward member 12d, the end 16d of the first member 11d is forced into the trough 15d. As pressure is applied to the first member 11d, the crushing of end 16d occurs, filling the trough 15 d with the material of flow volume 14d and finally deforming the material to form the fillets 23d as shown in FIG. 15. The ramming tool 42 is shaped such that the fillets are formed as the ramming tool 42 is driven against the second member 12d. It can be seen from FIG. 14 that, as the ramming tool is advanced toward the second member 12d, end 45 of the slot 43 is forced against the end 44 of the first member 11d thereby transmitting the required pressure to the members 11d and 12d. The mechanical interlock 48 is formed because of the angular disposition of the trough 15d in relation to the second member 12d. FIG. 15 illustrates this mechanical interlock 48 which provides a safety factor for the structural connection.

Although this invention has been disclosed and described with reference to particular examples and to preferred methods, the principals involved are susceptible of other applications which will be apparent to persons skilled in the art. Also, it should be understood that while specific reference has been made to titanium base alloys in reference to bonding temperatures, other wrought alloys can be used such as aluminum base alloys, stainless steel alloys, nickel base alloys, cobalt base alloys and columbium base alloys. It is understood that various changes in the form, detail and appearance of the present invention can be made by those skilled in the art without departing from the spirit and scope of the invention. This invention, therefore, is not intended to be limited to the particular embodiment or preferred methods herein disclosed.

I claim:

1. A method for fabricating a structure containing a filleted solid state homogeneous bond at the juncture between at least two metallic members to be joined comprising the steps of:
   a. determining the flow volume of material required to achieve the desired filleting and blending geometry at the juncture;
   b. providing on at least one of said metallic members to be joined, in the area of the desired juncture, an excess of about 5% to 10% of said flow volume required to achieve the desired filleting and blending geometry at the juncture, said entire flow volume being disposed on a portion of one of said members with simple machine cuts which is configurated to receive the other member to be therewith and said excess volume providing positive die fill at the juncture;
   c. providing a die assembly including a single direction ramming tool, said die assembly being arranged and configured to hold, form and bond said members in proper spatial relation so that when a force is applied to said die assembly said metallic members will be plastic flowed at the juncture to achieve the required intimate contact for diffusion bonding said metallic members and to form a filleted juncture with the desired finished geometry;
   d. cleaning said metallic members to be joined and said die to remove surface oxides and other foreign contaminants;
   e. placing said metallic members in said die assembly in proper spatial relationship to allow said flow volume and excess material to be plastic flowed at said juncture upon the application of sufficient force;
   f. heating said dies assembly and said metallic members in an inert atmosphere to a temperature in the plastic flow region of the metal and below the transformation temperature of said members;
   g. applying a pressure force of sufficient magnitude to said die assembly to plastic flow said flow volume and said excess volume of material in said die assembly causing high localized pressure and intimate contact of the metallic members at the juncture thereof without close tolerance fitup of said metallic members;
   h. holding said pressure for a sufficient time to allow the material plastic flowed to creep flow to achieve the desired juncture fillets and finished geometry and the complete diffusion of material across said juncture, said juncture being substantially free of voids;
   i. cooling said joined metallic members in said inert atmosphere; and
   j. removing said joined metallic members with the desired filleting and finished juncture geometry from said inert atmosphere.

2. The method of claim 1, wherein said die assembly is comprised of at least one restraining tool for maintaining said metallic members in proper spatial relation as said force is applied.

3. The method of claim 1 wherein said entire flow volume portion and its corresponding member are fabricated from a single piece of material, said entire flow volume portion and corresponding member being homogeneous.

4. The method of claim 1 wherein said excess volume of 5% – 10% provides positive fill while substantially eliminating the necessity of very close control tolerances on said members and said flow volume, said excess flow volume forming said flashing for subsequent removal.

5. The method of claim 1 including the additional step of removing said flashing from said joined members.

6. The method of claim 1, wherein said spatial relation between said members is such that the application of said force to said members causes at least one of said members to become deformed, thereby forming a mechanical interlock between said members.

7. The method of claim 1, wherein a first of said members has two flow volumes contained thereon, said flow volumes defining a trough into which one end of a second of said members is held in spatial relation by said die assembly.

8. The method of claim 7, wherein the angle between the axis of said trough and the longitudinal axis of said second member is from 15° to 30°, said angle causing said second member to bend in said trough when said force is applied to said members, thereby forming a mechanical interlock therebetween.

9. The method of claim 1, wherein said force and its direction are pre-determined from the quantity and position of said flow volume and the geometry of said members, and the duration of application of said force is determined from the plastic flow and creep characteristics of said members and said temperature.

10. The method of claim 9, wherein said force is increased by an amount which is required to form said members to a desired contour.

11. The method of claim 1, wherein said die assembly is fabricated from material that will not interdiffuse with the material of said members.

12. The method of claim 11, wherein the material of said members is titanium alloy and the material of said die assembly tooling is an alloy steel comprised of 22% chromium, 4% nickel and 9% manganese.

13. The method of claim 1 wherein said members to be joined together are tack welded to one another at non-critical peripheral points such that said members are maintained in proper spatial relation, said non-critical points being located where the excess of said flow volume forms a flashing on said members for subsequent removal.

14. The method of claim 1, wherein said die assembly is configured as a retort and said inert atmosphere is a vacuum of at least $10^{-4}$ torr.

15. The method of claim 14, including the additional steps of (i) evacuating said retort to check for leaks, (ii) purging said retort by alternately filling with an inert gas and evacuating it, and (iii) vacuum hot out-gassing said retort to remove remaining contaminants, all prior to final evacuation of said retort at said vacuum of $10^{-4}$ torr.

16. The method of claim 15, wherein said leak checking is done at a vacuum of about $10^{-4}$ torr, said inert gas is argon, and said vacuum hot out-gassing takes place at approximately 1000° F for at least 30 minutes.

17. The method of claim 1, wherein said die assembly is enclosed within a metallic membrane retort envelope and said inert atmosphere is a vacuum of at least $10^{-4}$ torr.

18. The method of claim 17, including the additional steps of (i) evacuating said retort envelope to check for leaks, (ii) purging said retort envelope by alternately filling with an inert gas and evacuating it, and (iii) vacuum hot out-gassing said retort envelope to remove remaining contaminants, all prior to final evacuation of said retort envelope to said vacuum of $10^{-4}$ torr.

19. The method of claim 18, wherein said leak checking is done at a vacuum of about $10^{-4}$ torr, said inert gas is argon, and said vacuum hot out-gassing takes place at approximately 1000° F for at least 30 minutes.

20. The method of claim 1, wherein said temperature is 50°–100° F below the transformation temperature of the alloy of said members.

21. The method of claim 1, wherein, said die assembly is heated in a vacuum furnace hot press to said temperature, said inert atmosphere being a vacuum of at least $10^{-4}$ torr maintained therein, said vacuum hot press providing said force by applying pressure to said die assembly.

22. The method of claim 1, wherein said members being joined are comprised of first and second thin layered shell structured members having extended ends and a third member disposed therein between, said third member having six flow volumes defining two troughs on each said thereof, said troughs being adapted to receive said ends of said first and second members respectively, the application of said force causing said ends to become deformed so as to form mechanical interlocks between each of said first and second members and said third member in addition to said diffusion bond.

23. The method of claim 22, wherein the angle between the axis of said troughs and the longitudinal axis of said ends of said first and second members is from 15° to 30°.

24. The method of claim 1, wherein said members being joined are comprised of a first thin layered shell structured member having extended ends and a second member, said second member having three flow volumes defining two troughs on one side thereof, said troughs being adapted to receive the ends of said first member, the application of force causing said ends to become deformed so as to form mechanical interlocks between said members in addition to said diffusion bond.

25. The method of claim 24 wherein the angle between the axis of said troughs and the longitudinal axis of said ends of said first members is from 15° to 30°.

26. The method of claim 1, wherein said members being joined are comprised of a first longitudinal member having a plurality of apertures close to a first end thereof and a second member, said second member having two flow volumes defining a trough, said first end of said first member being disposed within said trough, the application of said force causing material from said flow volumes to fill said aperture so as to form a mechanical interlock between said members in addition to said diffusion bond.

27. The method of claim 1, wherein said members being joined are comprised on a first longitudinal member having serrations at one end thereof and a second member, said second member having two flow volumes defining a trough, said serrated end of said first member being disposed within said trough, the application of said force causing material from said flow to volumes fill said serrations so as to form a mechanical interlock between said members in addition to said diffusion bond.

28. The method of claim 1, wherein said members being joined are comprised of a first longitudinal member having a flow volume at a first end thereof and a second member having a trough therein, the axis of said trough being disposed at an acute angle with respect to the longitudinal axis of said second member, said first end of said first member being disposed within said trough, the application of said force causing material from said flow volume to fill said trough so as to form a mechanical interlock between said members in addition to said diffusion bond.

29. The method of claim 28, wherein said acute angle is from 15° to 30°.

30. A method for fabricating a homogeneous, solid state diffusion bond between at least two members to be joined, comprising the steps of:

a. providing die assembly for applying a predetermined force to at least one flow volume which is a homogeneous portion of at least one of said members, said flow volume having a location, size and shape pre-determined from the blending geometry required at the juncture between said members and containing sufficient material to form fillets and to fill substantially all voids in the area of said bond, said force being pre-determined from the quantity and position of said flow volume and the geometry of said members, the duration of its application being pre-determined from the plastic flow and creep characteristics of said members and the temperature at which said deformation will take place, the amount and direction of said force, and the duration of its application, being sufficient to cause plastic flow deformation of said flow volume, said die assembly comprising at least one ramming tool for applying said force and at least one restraining tool for maintaining said members in proper spatial relation as said force is applied, said ramming and restraining tool being configured and shaped to achieve finished member geometry and fillets and to apply high localized pressure in the area of the juncture between said members, said die assembly being fabricated from material that will not interdiffuse with the material of said members;

b. cleaning the surfaces of said members and said die assembly;

c. tack welding said members to each other at noncritical peripheral locations so as to maintain their proper spatial relation during subsequent process steps, said noncritical points being in the areas where the excess of said flow volume forms a flashing for subsequent removal;

d. placing said members into said die assembly, said members being aligned in their proper spatial relation;

e. heating soaking said die assembly and said members at a temperature of about 50–100°F below the transformation temperature of said members, in an inert environment the duration of said heat soak being sufficient to achieve a uniform temperature of said members;

f. maintaining said temperature during the subsequent application of said force;

g. applying said force to said flow volume through said die assembly for at least said duration; and h. cooling said members, in the inert environment removing them from said die assembly and machining off flashing and protrusions therefrom.

31. The method of claim 30, wherein said spatial relation between said members is such that the application of said force to said members causes at least one of said members to become deformed, thereby forming a mechanical interlock between said members in addition to said diffusion bond.

32. The method of claim 30, wherein said flow volume is formed in said member by making simple machine cuts in the material of said member.

33. The method of claim 30, wherein the volume of said flow volume is 5 – 10% oversized, thereby providing positive fill while substantially eliminating the necessity of very close control tolerances of said members and said flow volume, the excess of said flow volume forming a flashing for subsequent removal.

34. The method of claim 30, wherein said force is increased by an amount which is required to form said members to a desired contour.

35. The method of claim 30, wherein the material of said members is titanium alloy and the material of said die assembly tooling is an alloy steel comprised of 22% chromium, 4% nickel and 9% manganese.

36. The method of claim 30, wherein said members are fabricated from titanium alloy and cleaned with nitric hydroflouric acid ($HNO_3$) and wherein said die assembly is fabricated from an alloy steel and cleaned with acetone.

37. The method of claim 30, wherein said leak checking is done at a vacuum of about $10^{-4}$ torr, said inert gas is argon, and said vacuum hot out-gassing takes place at approximately 1000° F. for at least 30 minutes.

38. The method of claim 30, wherein said members are made of titanium alloy and said force is maintained until said temperature drops to about 1400° F. in order to take advantage of creep deformation of said flow volume.

39. The method of claim 30, wherein a first of said members has two flow volumes contained thereon, said flow volumes defining a trough into which one end of a second of said members is held in spatial relation by said die assembly.

40. The method of claim 39, wherein the angle between the axis of said trough and the longitudinal axis of said second member is from 15° to 30°, said angle causing said second member to bend into said trough when said force is applied to said flow volumes, thereby forming a mechanical interlock therebetween in addition to said diffusion bond.

41. A method for fabricating a homogeneous, solid state diffusion bond between at least two titanium alloy members to be joined, comprising the steps of:

a. providing a die assembly for applying a predetermined force to at least one flow volume which is a homogeneous portion of at least one of said members, said flow volume being formed by simple machine cuts therein and having a location, size and shape pre-determined from the blending geometry required at the juncture between said members and containing sufficient material to form fillets and fill substantially all voids in the area of said bond, said force being pre-determined from the quantity and position of said flow volume and the geometry of said members, the duration of its application being pre-determined from the plastic flow and creep characteristics of said members and the temperature at which said deformation will take place, the amount and direction of said force, and the duration of its applicaton, being sufficient to cause plastic flow deformation of said flow volume, said die assembly comprising at least one ramming tool for applying said force to said flow volume and at least one restraining tool for maintaining said members in proper spatial relation as said force is applied, said ramming and restraining tool being configured and shaped to achieve finished members geometry and fillets and to apply high localized pressure in the area of the juncture between said member, said die assembly being fabricated from an alloy of steel comprised of 22% chromium, 4% nickel and 9% manganese, said spatial relation being such that the application of said force causes at least one of said members to become deformed, thereby forming a mechanical interlock between said members;

b. cleaning the surfaces of said members with nitric hydroflouric acid ($HNO_3$) and said die assembly with acetone;

c. tack welding said members to one another at non-critical peripheral locations so as to maintain the proper spatial relation during subsequent process steps, said non-critical points being in the areas where the excess of said flow volume forms a flashing for subsequent removal;

d. placing said members into said die assembly, said members being aligned in their proper spatial relation;

e. placing said die assembly within a vacuum furnace hot press;

f. checking said vacuum furnace-hot press for leaks by evacuating it;

g. removing remaining contaminants from said vacuum furnace-hot press, said die assembly and said members by vacuum hot out-gassing them at about 1000° F. for at least 30 minutes;

h. evacuating said vacuum furnace press to at least $10^{-4}$ torr;

i. heat soaking said die assembly and said members in said vacuum furnace press at a temperature about 50°–100° F. below the transformation temperature of the titanium alloy, the duration of said heat soak being sufficient to achieve a uniform temperature of said members;

j. causing said vacuum furnace press to apply pressure to said die assembly for at least said duration, so that said force is applied to said flow volume; and k. cooling said die assembly and said members, removing said members from said die assembly and machining off flashing and protrusions therefrom.

42. A method for fabricating a homogeneous, solid state diffusion bond between at least two metallic members to be joined, comprising the steps of:

a. determining the location, size and shape of material required to form at least one flow volume, said determination being made from the blending geometry required at the juncture between said members, said flow volume being a homogeneous portion of at least one of said members and formed with simple machine cuts and containing material over that required to form fillets and to fill substantially all voids in the area of about 5% to 10% excess said bond;

b. determining the amount and direction of the force, and the duration of its application, required to cause plastic deformation of said flow volume, said force being determined from the quantity and position of said flow volume and the geometry of said members, said duration of its application being determined from the plastic flow and creep characteristics of said members and the temperature at which said deformation will take place;

c. providing a die assembly comprising at least one ramming tool for applying said force in a single direction to said flow volumes and at least one restraining tool for maintaining said members in proper spatial relation as said force is applied, said ramming and restraining tool being configured and shaped to achieve finished member geometry and fillets and to apply high localized pressure in the area of the juncture between said members, said die assembly being fabricated from material that will not interdiffuse with the material of said members;

d. cleaning the surfaces of said members and said die assembly;

e. tack welding said members to one another at noncritical peripheral locations so as to maintain their proper spatial relation during subsequent process steps, said noncritical points being in areas where said excess material of said flow volume forms a flashing for subsequent removal;

f. placing said members into said die assembly, said members being aligned in their proper spatial relation;

g. enclosing said die assembly within a metallic membrane retort envelope, said retort envelope being sealed;

h. checking said retort envelope for leaks by evacuating it;

i. purging said retort envelope by alternately filling it with an inert gas and evacuating it for at least three cycles;

j. removing remaining contaminants from said retort envelope by vacuum hot out-gassing it;

k. evacuating said retort envelope to at least $10^{-4}$ torr;

l. heating soaking said die assembly and said members at a temperature of about 50–100°F below the transformation temperature of said members, and duration of said heat soak being sufficient to achieve a uniform temperature of said members;

m. applying said force to said flow volume through said die assembly for at least said duration; and n. cooling said members and said die assembly, removing said members from said die assembly and machining off said flashing therefrom.

43. A method for fabricating a homogeneous, solid state diffusion bond between at least two titanium alloy members to be joined, comprising the steps of:

a. determining the location, size and shape of material required to form at least one flow volume, said determination being made from the blending geometry required at the juncture between said members, said flow volume being formed in at least one of said members by simple machine cuts therein and being a homogeneous portion thereof, said flow volume containing sufficient material to form fillets and to fill substantially all voids in the area of said bond;

b. determining the amount and direction of the force, and the duration of its application, required to cause plastic deformation of said flow volume, said force being determined from the quantity and position of said flow volume and the geometry of said members, said duration of its application being determined from the plastic flow and creep characteristics of said members and the temperature at which said deformation will take place;

c. providing a die assembly comprising at least one ramming tool for applying said force to said flow volume and at least one restraining tool for maintaining said members in proper spatial relation as said force is applied, said ramming and restraining tool being configured and shaped to achieve finished member geometry and fillets and to apply high localized pressure in the area of the juncture between said members, said die assembly being fabricated from an alloy of steel comprised of 22% chromium, 4% nickel and 9% manganese, said spatial relation being such that the application of said force causes at least one of said members to become deformed, thereby forming a mechanical interlock between said members;

d. cleaning the surfaces of said members with nitric hydroflouric acid ($HNO_3$) and said die assembly with acetone;

e. tack welding said members to one another at noncritical peripheral locations so as to maintain their proper spatial relation during subsequent process steps, said non-critical points being in the area where the excess of said flow volume forms a flashing for subsequent removal;

f. placing said members into said die assembly, said members being aligned in their proper spatial relation;

g. placing said die assembly within a vacuum furnace hot press;

h. checking said vacuum furnace press for leaks by evacuating it;

i. removing remaining contaminants from said vacuum furnace press, said die assembly and said members by vacuum hot out-gassing them at about 1000° F. for at least 30 minutes;

j. evacuating said vacuum furnace press to at least $10^{-4}$ torr;

k. heat soaking said die and said members in said vacuum furnace press at temperature about 50°–100° F. below the transformation temperature of the titanium alloy, the duration of said heat soak being sufficient to achieve a uniform temperature of said members;

l. causing said vacuum furnace press to apply pressure to said die assembly for at least said duration, so that said force is applied to said flow volume; and m. cooling said die assembly and said members, removing said members from said die assembly and machining off flashing and protrusions therefrom.

* * * * *